United States Patent
Kwag et al.

(10) Patent No.: US 10,582,548 B2
(45) Date of Patent: Mar. 3, 2020

(54) NETWORK HUB MANAGEMENT METHOD AND DEVICE IN WIRELESS COMMUNICATION SYSTEM

(71) Applicant: Samsung Electronics Co., Ltd., Gyeonggi-do (KR)

(72) Inventors: Heuisam Kwag, Gyeonggi-do (KR); Daedong Kim, Gyeonggi-do (KR); Heedong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/763,363

(22) PCT Filed: Sep. 23, 2016

(86) PCT No.: PCT/KR2016/010711
§ 371 (c)(1),
(2) Date: Mar. 26, 2018

(87) PCT Pub. No.: WO2017/052303
PCT Pub. Date: Mar. 30, 2017

(65) Prior Publication Data
US 2018/0279389 A1    Sep. 27, 2018

(30) Foreign Application Priority Data
Sep. 24, 2015 (KR) .................. 10-2015-0135610

(51) Int. Cl.
*H04W 76/10* (2018.01)
*H04L 12/28* (2006.01)
(Continued)

(52) U.S. Cl.
CPC ......... *H04W 76/10* (2018.02); *H04L 12/2803* (2013.01); *H04L 41/14* (2013.01); *H04L 49/555* (2013.01); *H04B 17/318* (2015.01)

(58) Field of Classification Search
CPC .... H04W 76/10; H04L 41/0654; H04L 69/40; H04L 12/2803; H04L 49/555; H04L 41/14; H04B 17/318
See application file for complete search history.

(56) References Cited

U.S. PATENT DOCUMENTS 6,639,895 B1    10/2003  Helles et al.
2002/0147823 A1*  10/2002  Healy .................. H04L 12/2856
                                                           709/230
(Continued)

FOREIGN PATENT DOCUMENTS

EP         2287692        2/2011

OTHER PUBLICATIONS

PCT/ISA/210 Search Report issued on PCT/KR2016/010711 (pp. 3).
PCT/ISA/237 Written Opinion issued on PCT/KR2016/010711 (pp. 5).

*Primary Examiner* — Afshawn M Towfighi
(74) *Attorney, Agent, or Firm* — The Farrell Law Firm, P.C.

(57) ABSTRACT

Disclosed is a technology for a sensor network, machine to machine (M2M) communication, machine type communication (MTC), and the Internet of things (IoT). The disclosure can be utilized in an intelligent service (smart home, smart building, smart city, smart car or connected car, health care, digital education, retail business, security and safety-related services, and the like) based on the technology. A server control method according to the present invention comprises the steps of: receiving, from at least one network hub, communication state information on at least one electronic device connected to the at least one network hub; determining, on the basis of the received communication state information, another network hub for a connection of a first electronic device connected to the network hub on
(Continued)

which an abnormal operation of a certain network hub is sensed, if the abnormal operation is sensed; and transmitting a request for a connection of the first electronic device to the determined other network hub.

13 Claims, 16 Drawing Sheets

(51) Int. Cl.
*H04L 12/24* (2006.01)
*H04L 12/939* (2013.01)
*H04B 17/318* (2015.01)

(56) References Cited

U.S. PATENT DOCUMENTS

| | | |
|---|---|---|
| 2009/0175176 A1 | 7/2009 | Mohan |
| 2011/0026407 A1 | 2/2011 | Yamada et al. |
| 2013/0223423 A1* | 8/2013 | Lee ................. H04W 48/16 370/338 |
| 2014/0211608 A1 | 7/2014 | Fan |

* cited by examiner

NETWORK HUB MANAGEMENT METHOD AND DEVICE IN WIRELESS COMMUNICATION SYSTEM

PRIORITY

This application is a National Phase Entry of PCT International Application No. PCT/KR2016/010711 which was filed on Sep. 23, 2016, and claims priority to Korean Patent Application No. 10-2015-0135610, which was filed on Sep. 24, 2015, the content of each of which is incorporated herein by reference.

TECHNICAL FIELD

The present invention relates to a method and device for managing a network hub in a wireless communication system and, in particular, to a method and device for making it possible for a terminal to perform communication even when an arbitrary network hub operates abnormally in the case where multiple network hubs exist.

BACKGROUND ART

The Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies.

In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

In order to implement an IoT environment, it is necessary for a plurality of devices communicating among each other to connect to a server via a network hub. In a broad sense, if the network hub for communication between the server and electronic devices operates abnormally, the server is likely to experience problems in communicating with the electronic device.

There is therefore a need of a method for a user to use electronic devices without inconvenience in the IoT environment even when the network hub operates abnormally

DISCLOSURE OF INVENTION

Technical Problem

The present invention aims to provide a method for allowing a terminal connected to a network that operates abnormally to maintain the communication state.

Solution to Problem

In accordance with an aspect of the present invention, a control method of a server includes receiving communication status information of at least one electronic device connected to at least one network hub from the at least one network hub; determining, if an abnormal operation of a network hub is detected, another network hub for connection of a first electronic device connected to the abnormally-operating network hub based on the received communication status information; and transmitting a connection request of the first electronic device to the determined network hub.

In accordance with another aspect of the present invention, a control method of a server includes receiving a range scan message from at least one network hub, determining at least one of a length of a path through which the range scan message is transmitted and a received signal strength indication or received signal strength indicator information based on the received range scan message, and determining, if the network hub to which the electronic device is connected operates abnormally, another network hub to connect thereto based on at least one of the determined path length and received signal strength indication information.

Advantageous Effects of Invention

The present invention is advantageous in terms of making it possible for at least one terminal connected to a network hub to connect to another network hub when the connected network hub operates abnormally in a situation where at least one network hub exists.

The present invention is advantageous in terms of allowing at least one terminal to establish a connection to a network hub that has recovered from an abnormality.

MODE FOR THE INVENTION

Figure 1:
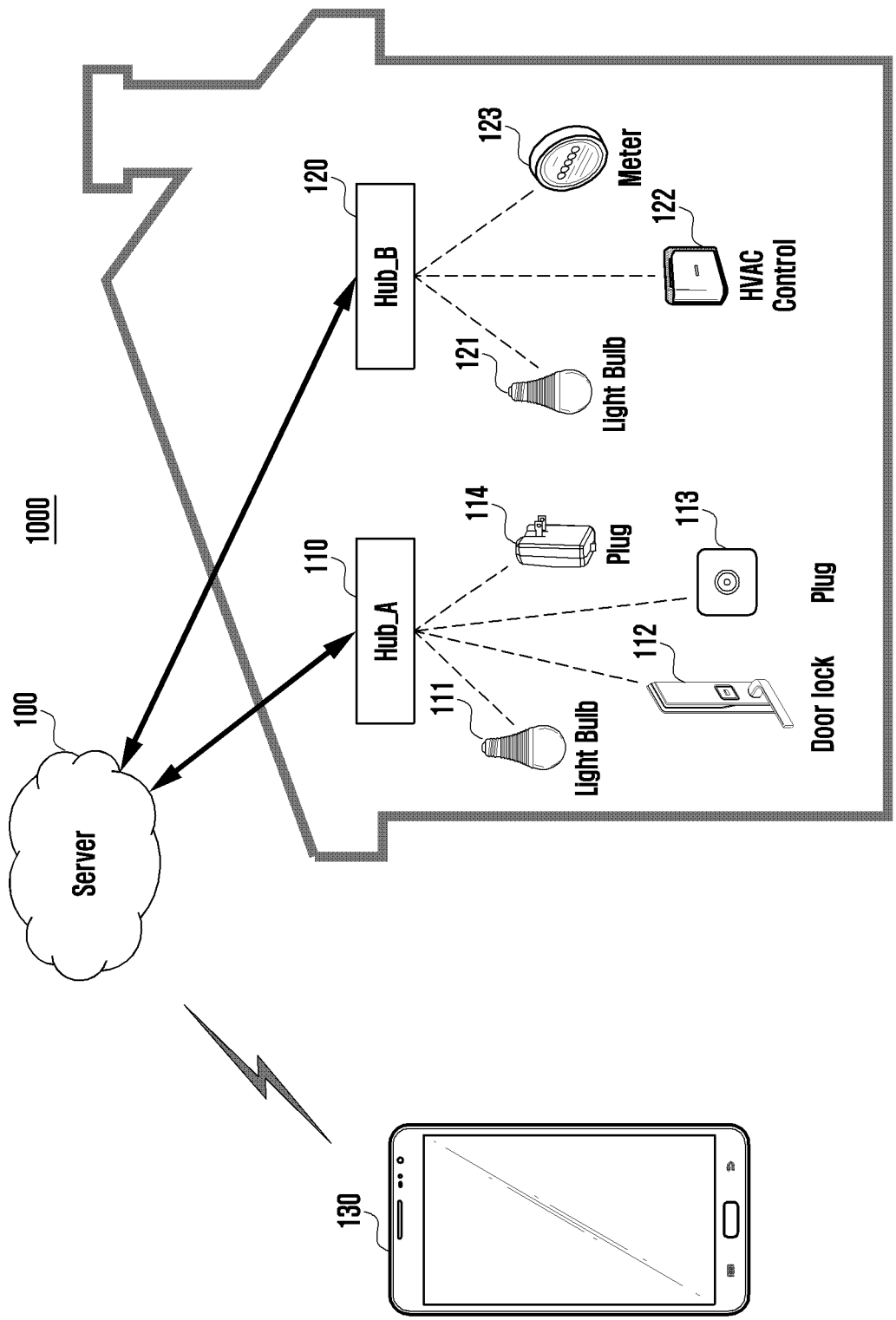
FIG. 1 is a diagram illustrating a network system according to an embodiment of the present invention.

Various changes may be made to the invention, and the invention may have various forms, such that exemplary embodiments will be illustrated in the drawings and described in detail. However, such an embodiment is not intended to limit the invention to the disclosed exemplary embodiment and it should be understood that the embodiments include all changes, equivalents, and substitutes within the spirit and scope of the invention. Detailed descriptions of well-known functions and structures incorporated herein may be omitted to avoid obscuring the subject matter of the present invention.

As used herein, terms such as "first," "second," etc. are used to describe various components. However, it is obvious that the components should not be defined by these terms. The terms are used only for distinguishing one component from another component.

The terms appearing in the specification are used for illustrative purposes only and are not used for limiting the scope of the present invention. As used herein, the singular forms "a", "an", and "the" are intended to include the plural forms as well, unless the context clearly indicates otherwise. It will be further understood that the terms "comprises" and/or "has", when used in this specification, specify the presence of a stated feature, number, step, operation, component, element, or a combination thereof and do not preclude the presence or addition of one or more other features, numbers, steps, operations, components, elements, or combinations thereof.

Throughout the specification, a module or a unit carries out at least one function or operation and may be implemented in hardware or software or as a combination of hardware and software. Also, a plurality of modules or units may be integrated into one module by at least one processor (not shown) with the exclusion of the module or unit that should be implemented with specific hardware.

FIG. 1 is a diagram illustrating a network system 1000 according to an embodiment of the present invention. In detail, FIG. 1 illustrates an embodiment of a network system including network hub A 110 and network hub B 120 and a plurality of electronic devices connected to the network hub A 110 and network hub B 120 inside a residential or office building and a server 100 outside the building connected to the network hub A 110 and network hub B 120 for communication.

Although the embodiment of FIG. 1 shows the server 100, network hub A 110, and network hub B 120, there may be one or more other network hubs located at one or more buildings or places, the network hubs being connected to the server 100.

The server 100 may communicate with the network hub A 110 and network hub B 120 based on a registration procedure. The server 100 may be connected to the network hub A 110 and network hub B 120 through wired or wireless links. The server 100 may communicate with the first to fourth electronic devices 111 to 114 via the network hub A 110 to which the first to fourth electronic devices 111 to 114 are connected. The server 100 may communicate with the fifth to seventh electronic devices 121 to 123 via the network hub B 120 to which the fifth to seventh electronic devices 121 to 123 are connected.

Each network hub may communicate with the electronic devices using various communication protocols. For example, it may be possible to use at least one of wireless fidelity (Wi-Fi), Bluetooth, near field communication (NFC), ZigBee, and Z-WAVE for communication.

In the case of using ZigBee, the network hub may include a coordinator for establishing a network router for extending the network and delivering multi-hop routing messages.

In the case of using Wi-Fi or Bluetooth, the network hub may first send connection information such as SSID or session key to establish a communication link with an electronic device and then exchange various pieces of information with the connected electronic device.

The network hub may communication with individual electronic devices using one or more protocols. For example, the network hub A 110 may perform the aforementioned Wi-Fi communication, while performing ZigBee communication with the first to fourth electronic devices 111 to 114 using the coordinator and router included therein.

The server 100 may receive a command for control at least one of the first to seventh electronic devices 111 to 114 and 121 to 123 from a user terminal 130 that is not connected to any network hub. The server 100 may send the received control command to the network hub A 110 or the network hub B 120 to control at least one of the first to seventh electronic devices 111 to 114 and 121 to 123.

In the embodiment of FIG. 1, if the server 100 detects an abnormal operation of the network hub A 110, it may control the first to fourth electronic devices 111 to 114 to switch their connections from the network hub A 110 to the network hub B 120.

If normal operation of the network hub A 110 is recovered, the server 100 may control the first to fourth electronic devices 110 to 114 that are temporarily connected to the network hub B 120 so that they switch back to the network hub A 110.

Figure 2:
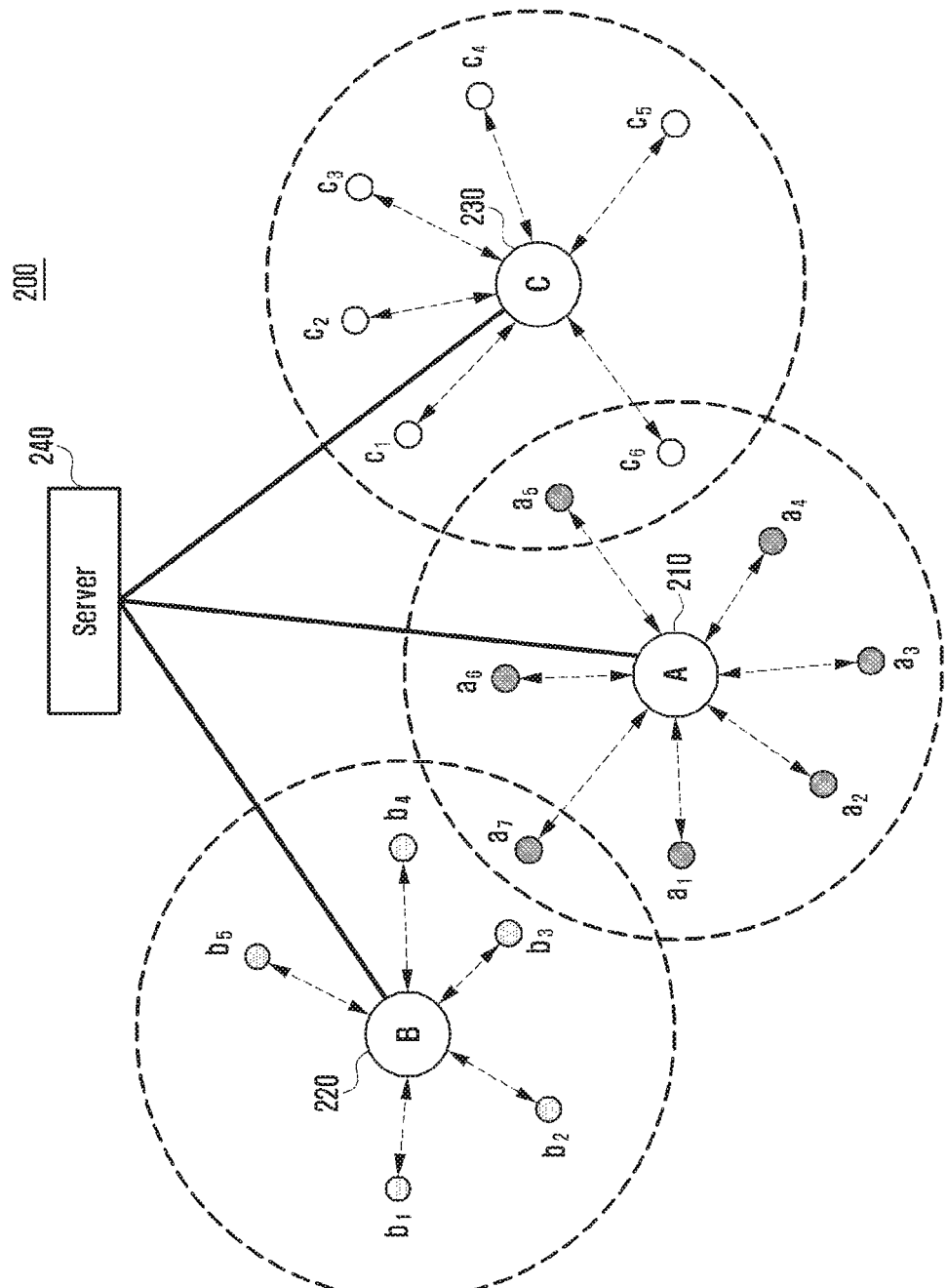
FIG. 2 is a diagram illustrating a network system according to another embodiment of the present invention.

FIG. 2 is a diagram illustrating a network system 200 according to another embodiment of the present invention. The network system 200 depicted in FIG. 2 may include network hub A 210, network hub B 220, and network hub C 230. However, this is just an exemplary embodiment, and the network system 200 may include one or more additional network hubs.

In the embodiment of FIG. 2, for communication, the network hub A 210 is connected with the electronic devices a1 to a7, the network hub B 220 is connected with the electronic devices b1 to b5, and the network nub C 230 is connected with the electronic devices c1 to c6. As described above, each electronic device may connect to each network hub using one of various communication protocols.

The network hub A 210, network hub B 220, and network hub C 230 may establish wired or wireless connections with the server 240 based on the registration procedure.

Figure 3:
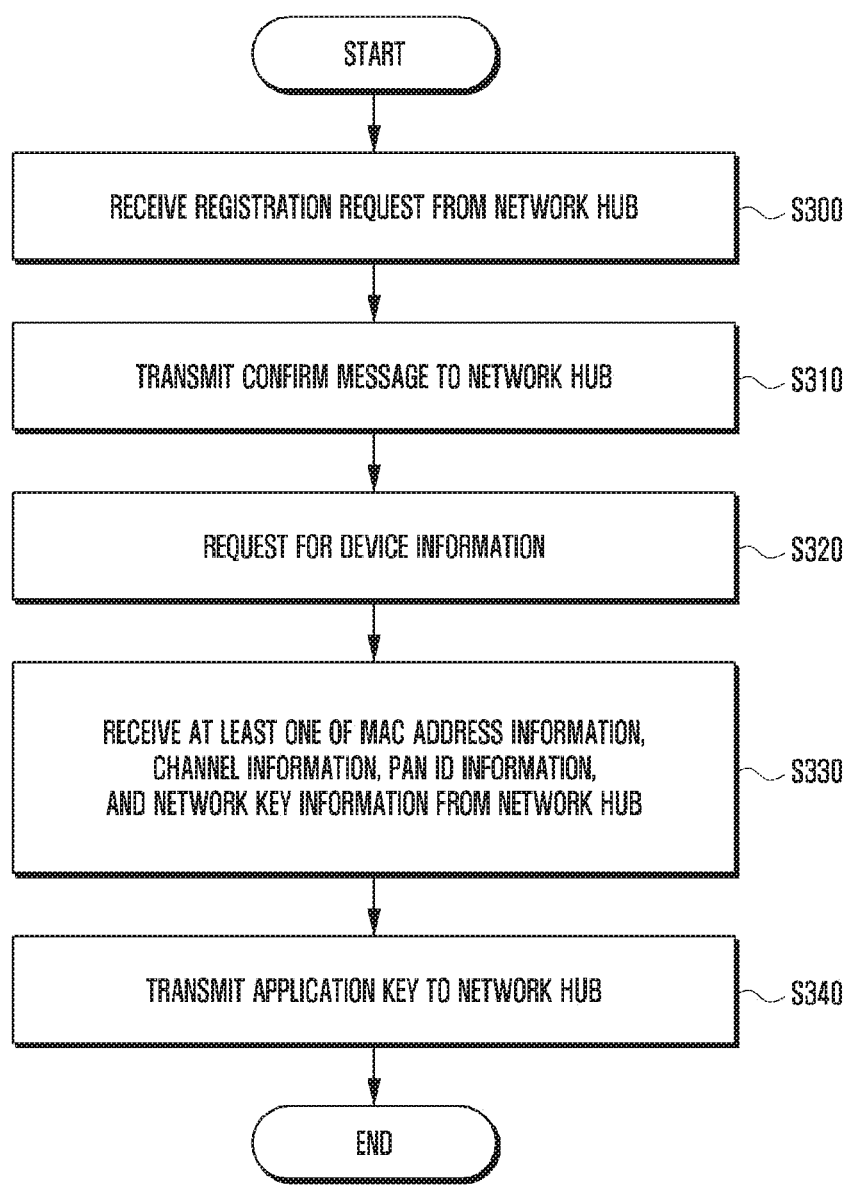
FIG. 3 is a flowchart illustrating a method for registering a network hub with a server according to an embodiment of the present invention.

A description is made of a method for registering a network hub with a server in detail with reference to FIG. 3.

At step S300, the server may receive a registration request from a network hub. If it is determined that the server is capable of communicating with the network hub that has transmitted the registration request, the server may send the network hub a confirm message at step S310.

At step S320, the server may request for device information to the network hub to which the confirm message has been transmitted.

At step S330, the server may receive at least one of MAC Address information, Channel information, personal area network (PAN) ID information, and network key information.

In addition to the aforementioned information, the server may receive other information for configuring a communication scheme with the network hub.

At step S340, the server may send an application key to the network hub. The application key may be a key issued based on the account of the network hub and the location where the network hub is installed.

In detail, the server may send the same application key to the network hubs located within a predetermined physical range. For example, if there is at least one network hub on each floor of a three-story building, the server may send the same application key to the network hubs located on the same floor.

In the embodiment of FIG. 2, each of the network hubs 210, 220, and 230 may send the server 240 a range scan message over all channels periodically, the range scan message having been encrypted with the application key received from the server.

In detail, each of the network hub A 210, network B 220, and network nub C 230 may transmit the encrypted range scan message in order for it to be received by neighboring network hubs and electronic devices.

The neighboring devices may use different channels. Accordingly, each of the network hubs 210, 220, and 230 transmit the range scan message over all channels periodically such that the network hubs and electronic devices using different channels receive the range scan message.

However, each of the network hubs 210, 220, and 230 may encrypt the message with the application key and transmit the encrypted message in an inter-pan communication mode in order for only the neighboring devices with the same account to decrypt and identify the message.

If the range scan message is received through a network hub, the electronic device determines the path through which the range scan message is received and measures a received signal strength indication or received signal strength indicator (RSSI) using the range scan message.

Figure 4:
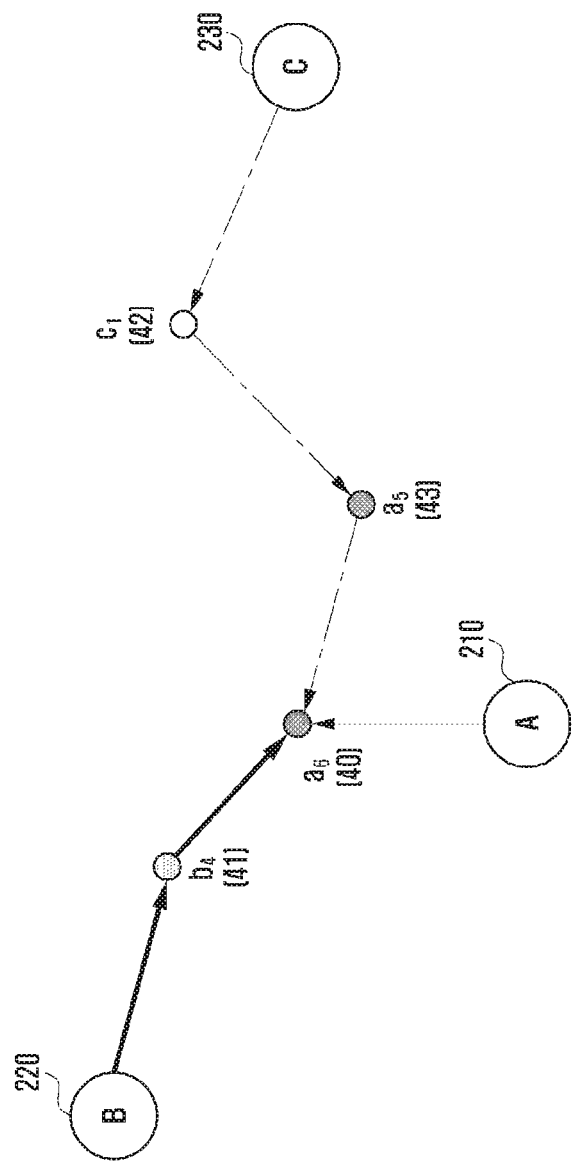
FIG. 4 is a diagram for explaining a message transmission among some of the devices depicted in FIG. 2 according to an embodiment of the present invention.

For example, as shown in FIG. 4 depicting only some of the devices of FIG. 2, the electronic device a6 40 connected to the network hub A 210 may receive the range scan message from the network hub A 210. Since the electronic device a6 40 has received the range scan message from the network hub A 210, it sets the sequence number corresponding to a length of the message reception path to 1. If the electronic device a6 40 is located physically close to the network hub A 210 and there is no obstacle between the electronic device a6 40 and the network hub A 210, the RSSI value of −30 may be measured.

The electronic device a6 40 may also receive the range scan message transmitted by the network hub B 220 via the electronic device b4 41. The electronic device b4 41 may send the electronic device a6 40 the range scan message with a sequence number set to 1. The electronic device a6 40 may change the sequence number 1 to 2 and determine that the range scan message is received through two paths.

Although the physical distance between the electronic device a6 40 and the electronic device b4 41 is longer than that between the electronic device a6 40 and the network hub A 210, if there is no obstacle between the electronic device a6 40 and the electronic device b4 41, the RSSI value of −40 is measured.

The electronic device a6 40 may receive the range scan message transmitted by the network hub C 230. According to an embodiment of the present invention, the electronic device a6 40 may receive the range scan message via the electronic device c1 42 and the electronic device a5 43.

The electronic device c1 42 may set the sequence number to 1, and the electronic device a5 may set the sequence number to 2. Accordingly, the electronic device a6 40, which has received the range scan message from the electronic device a5, may set the sequence number to 3.

Assuming that there is obstacle between the electronic device a5 43 and the electronic device a6 40, the electronic device a6 40 may measure the RSSI value of −60.

The electronic device a6 40 may store the determined sequence number and RSSI value. The electronic device a6 40 may generate communication status information including the sequence number and RSSI value and send the communication status information to the server 240 via the network hub A 210.

According to another embodiment of the present invention, the electronic device a6 40 may determine whether the sequence number received from another electronic device is a minimum value and determined the electronic device that has transmitted the sequence number of the minimum value. The electronic device a6 40 may determine whether the RSSI received from another electronic device has a maximum value and determined the electronic device that has transmitted the RSSI of the maximum value.

In the case of updating another electronic device that has transmitted the sequence number of the minimum value or the RSSI of the maximum value, the electronic device a6 40 may send the server 240 only the update result as the communication status information.

The server 240 may receive the communication status information generated as described above from the respective electronic devices. The server 240 may also generate a communication status information map for at least one electronic device using the communication status information.

If the server detects an abnormal operation of a network hub, it may determined another network hub for the electronic device connected to the abnormally-operating network hub based on the received communication status information. The server may send a connection request from the electronic device to the newly determined network hub.

Figure 5:
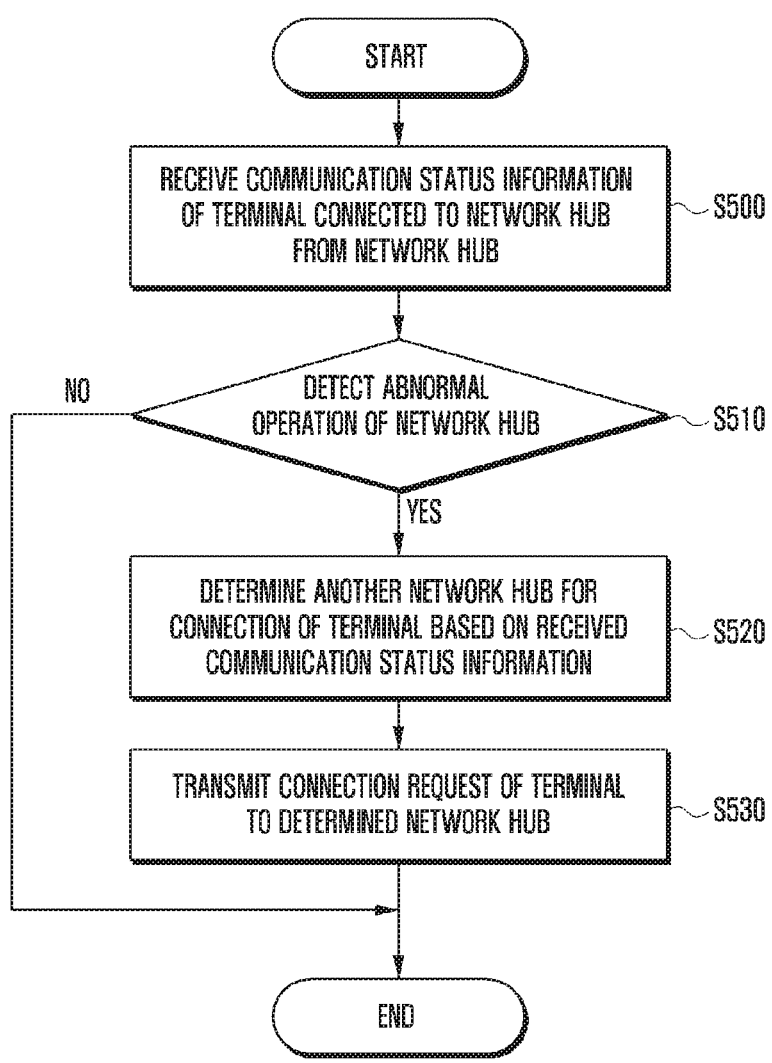
FIG. 5 is a flowchart illustrating a control method for a case where a server detects an abnormal operation of a network hub according to an embodiment of the present invention.

FIG. 5 is a flowchart illustrating a control method for a case where a server detects an abnormal operation of a network hub according to an embodiment of the present invention.

At step S500, the server may receive communication status information of a terminal from a network hub to which the terminal is connected.

If the server detects an abnormal operation of the network hub at step S510, the server may determined another network hub, at step S520, for connection of the terminal based on the received communication status information.

The server may receive the terminal communication status information from the respective network hubs at a predetermined interval and, if the communication status information is not received from a certain network hub over a predetermined time period, assume that the corresponding network hub operates abnormally.

The server may transmit or receive a status information message with the respective network hubs. For example, the server may transmit or receive the status information message with the respective network hubs. If the message is received periodically, the server may assume that the network hub that is transmitting the message is operating normally. If the message is not received over the predetermined period or if the message is not received in a threshold time since the receipt of a message transmission request from the network hub, the server may assume that the network hub is operating abnormally.

The server may determined another network hub for connection of the at least one terminal connected to the abnormally-operating network hub based on the communication status information map generated based on the communication status information received via or from the respective network hubs.

According to another embodiment of the present invention, the at least one terminal connected to the abnormally-operating network hub may determine another network hub to connect to autonomously. The terminal may report to the server that another network hub is determined. A detailed description thereof is made later.

At step S530, the server may send the determined another network hub a connection request of the terminal. For example, the server may transmit the information on the abnormally-operating network hub to the determined another network hub. The determined another network hub may establish a connection with the terminal based on the received information.

As described above, when a certain network hub operates abnormally, the terminal connected to the abnormally-operating network hub may switch its connection to another network hub. Accordingly, the user may use the terminal that is connected to a network hub.

Figure 6A:
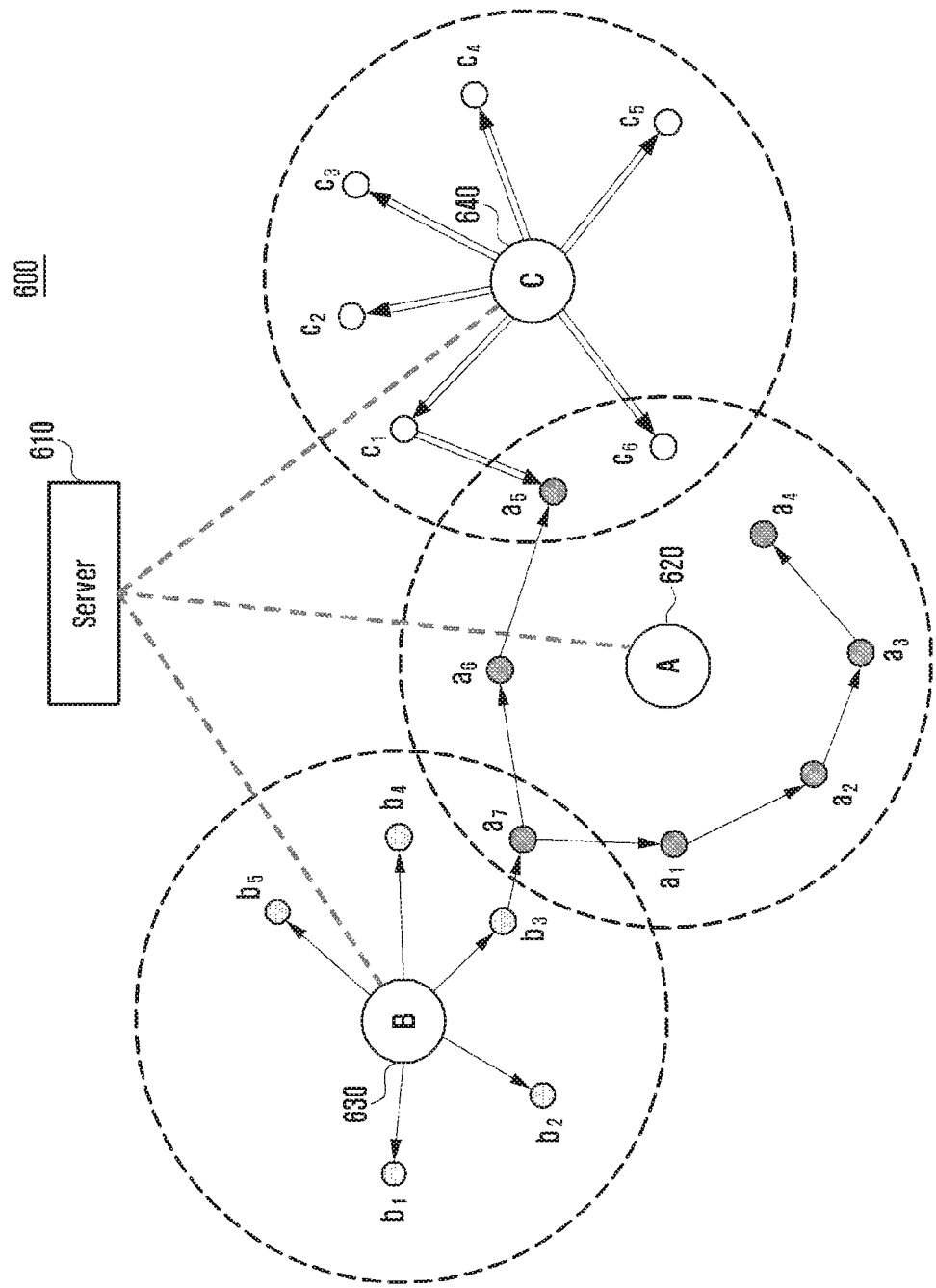
FIGS. 6A and 6B are diagrams for explaining range scan message transmission in the case where network hub A operates abnormally according to an embodiment of the present invention.
Figure 6B:
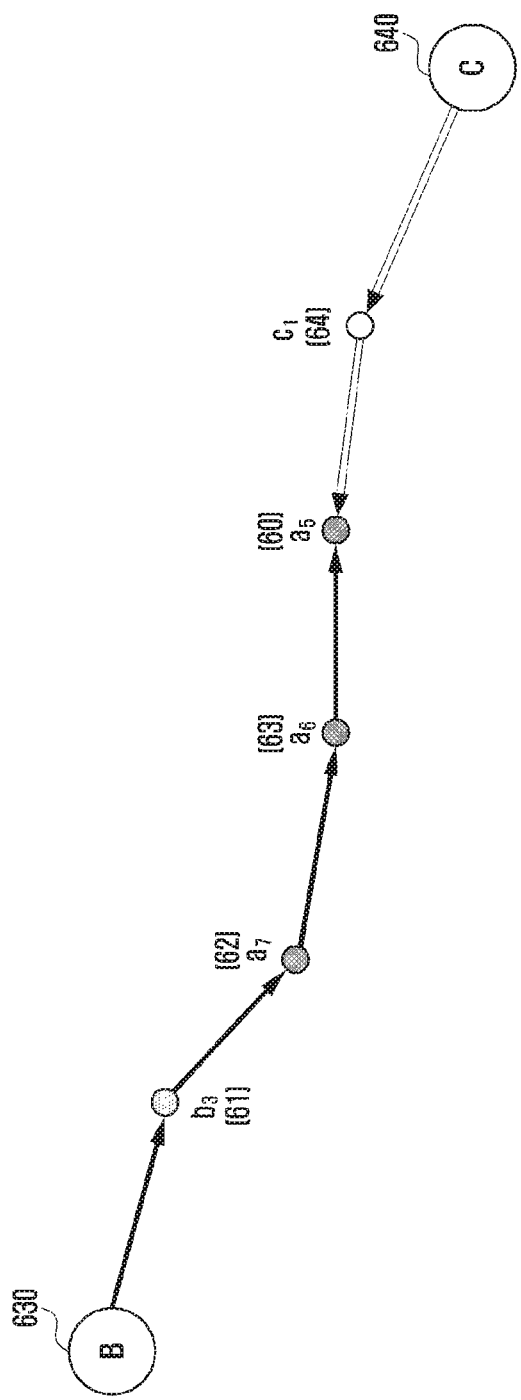

A description is made of the method for a server to control the electronic device a5 connected to the network hub A to switch its connection to another network hub when the network hub A is operating abnormally, with reference to FIGS. 6A and 6B.

As described above, it is assumed that the server may receive communication status information from individual electronic devices and generate a communication status information map based on the received communication status information before the network hub A operates abnormally.

FIG. 6A is a diagram illustrating a network system 600 including a server 610 and network hub A 620, network hub B 630, and network hub C 640 that are communicating with the server 610.

The server 610 may transmit and receive messages with the network hub A 620, network hub B 630, and network hub C 640 periodically. For example, the server 610 may transmit and receive a 'keep-alive' message with the network hubs.

If the server 610 receives periodically a message from a network hub, it may assume that the corresponding network hub is operating normally.

Accordingly, if a message is not received over a predetermined time period or in a threshold time since the receipt of a message transmission request message from the network hub, the server 610 may assume that the corresponding network hub is operating abnormally.

As shown in FIG. 6A, if the server 610 detects that the network hub A 620 is operating abnormally, it may make a determination for the electronic devices a1 to a7 connected to the network hub A 20 to switch their connection to the network hub B 630 or the network hub C 640.

For example, the server 610 may determine another network hub for the electronic device connected to the network hub A 620 to switch its connection to based on at least one of a received signal strength indication or received signal strength indicator (RSSI) information, a path length, and a number of electronic devices connected to the network hubs 630 and 640 except for the network hub A 620 operating abnormally that are included in the communication status information.

FIG. 6B is a diagram for explaining a method for determining a network hub for connecting electronic device a5 60. In FIG. 6B, the arrows denote the aforementioned range scan message transmission.

As shown in FIG. 6B, the electronic device a5 60 may receive a range scan message from the network hub B 630. The electronic device a5 60 may receive the range scan message transmitted by the network hub B 630 via the electronic device b3 61, electronic device a7 62, and electronic device a6 63.

The electronic device b3 61 may set a sequence number to 1, and the electronic device a7 62 may update the sequence number to 2. The electronic device a6 63 may update the sequence number to 3, and the electronic device a5 60 may update the sequence number to 4.

Likewise, the electronic device a5 60 may set the sequence number to 2 because the range scan message transmitted by the network hub C 640 is received via the electronic device c1 64.

If the electronic device a5 60 is located physically far from the electronic device a6 63 and there is no obstacle between the electronic device a5 60 and the electronic device a6 63, the RSSI value of –30 may be measured.

If the electronic device a5 60 is located physically close to the electronic device c1 64 and there is an obstacle between the electronic device a5 60 and the electronic device c1 64, the RSSI value of –60 may be measured.

The electronic device a5 60 may store the determined sequence number and RSSI value. The electronic device a5 60 may generate communication status information including the sequence number and RSSI value and send the communication status information to the server 610 via the network hub A 620.

The server 610 may determine another network hub for connection of the electronic device a5 60 upon detecting an abnormal operation of the network hub A 620 based on the communication status information received before the network hub A 620 operates abnormally.

Since it is typical that if the sequence number is small this means that the transmission path of the range scan message is short, the server 610 may determine the network hub with the smallest sequence number.

In the embodiment of FIG. 6B, the sequence number of the range scan message transmitted by the network hub C 640 is 2, and the server 610 may determine the network hub C 640 as a new network hub for connection of the electronic device a5 60.

Meanwhile, the server 610 may determine a new network hub for connection of the electronic device a5 60 based on the RSSI value.

Figure 7:
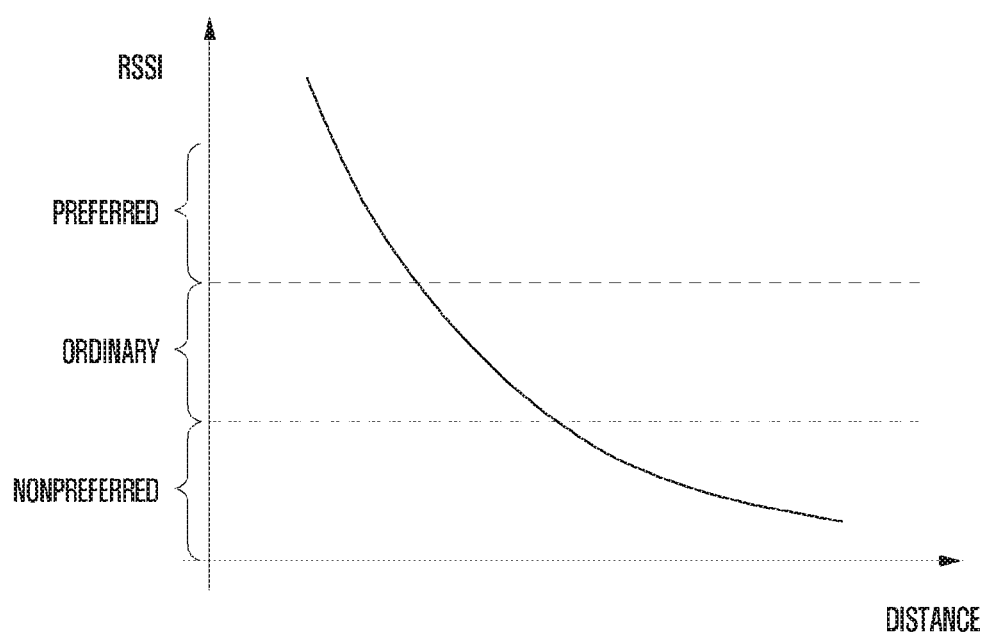
FIG. 7 is a diagram illustrating the correlation between distance and RSSI value according to an embodiment of the present invention.

FIG. 7 shows that the RSSI value is inversely proportional to distance. The server 610 may be likely to determine that the network hub with a large RSSI value is located close to the corresponding electronic device. Accordingly, the server 610 may determine the network hub that has transmitted the message including the RSSI value greater than a threshold value as a new network hub for connection of the electronic device.

As described in the embodiment of FIG. 6B, the RSSI value may vary depending on the environment such as presence of an obstacle or Wi-Fi access point (AP) between the network hub and the electronic device as well as the distance between the network hub and the electronic device.

Accordingly, in FIG. 6B, the server 610 may determine the network hub B 630 that has transmitted the range scan message with a large RSSI value, even though it is located physically far from the electronic device a5 60, as a new network hub for connection of the electronic device a5 60 instead of the network hub C located physically close to the electronic device a5 60.

The server 610 may also determine a new network hub for connection of the electronic device based on the numbers of electronic devices connected to the network hubs.

For example, if the network hub B 630 is in communication with a total of 20 electronic devices including the electronic devices depicted in FIG. 6A and the network hub C 640 is in communication with a total of 10 electronic devices, the server 610 may determine the network hub C 640 as a new network hub for connection of the electronic device a5 60.

The server 610 may determine a new network hub for connection of the electronic device connected to the abnormally-operating network hub based on all of the sequence number, RSSI value, and numbers of electronic devices connected to the respective network hubs.

The server 610 may also assign priorities or weights to the sequence number, RSSI value, and number of the electronic devices connected to the network hub for determining a new network hub for connection of the electronic device connected to the abnormally-operating network hub.

In the embodiment of FIG. 6B, after determining a new network hub for connection of the electronic device a5 60, the server 610 may send a mode switching message to the network hub C 640.

Then, the server 610 may send the information on the network hub A 620 to the network hub C 640. For example, the server 610 may send the network hub C 640 the channel information and PAN ID information of the network hub A 620.

The server 610 may also send the network hub C 640 a list of the electronic devices that have connected to the network hub A 620.

Upon receipt of the mode switching message, the network hub C 640 may enter a state capable of accepting connection of the electronic device a5 60 included in the list. For example, the network hub C 640 may change its channel for the channel of the network hub A 620 to transmit channel switching information to the electronic devices that have already been connected to the network hub C 640.

According to the information received from the server 610, the network hub C 640 may send a message to the electronic device a5 60. Upon receipt of the message, the electronic device a5 60 may send a connection request message.

If a connection is established between the network hub C 640 and the electronic device a5 60, the network hub C 640 updates the connected electronic device list and sends the updated list to the server 610.

The information or messages transmitted among the server, network hubs, and electronic devices may be encrypted with an application key initially issued by the server. For example, the messages may be transmitted/received in an inter-pan communication mode.

The above-described method makes it possible for an electronic device connected to the network hub A 620 to switch its connection to another network hub when the network hub A 620 is operating abnormally.

Accordingly, when a control command for controlling the electronic device a5 60 is received from a user terminal, the server 610 transmits the control command to the network hub C 640 in order for the user to use the electronic device a5 60 continuously.

Figure 8:
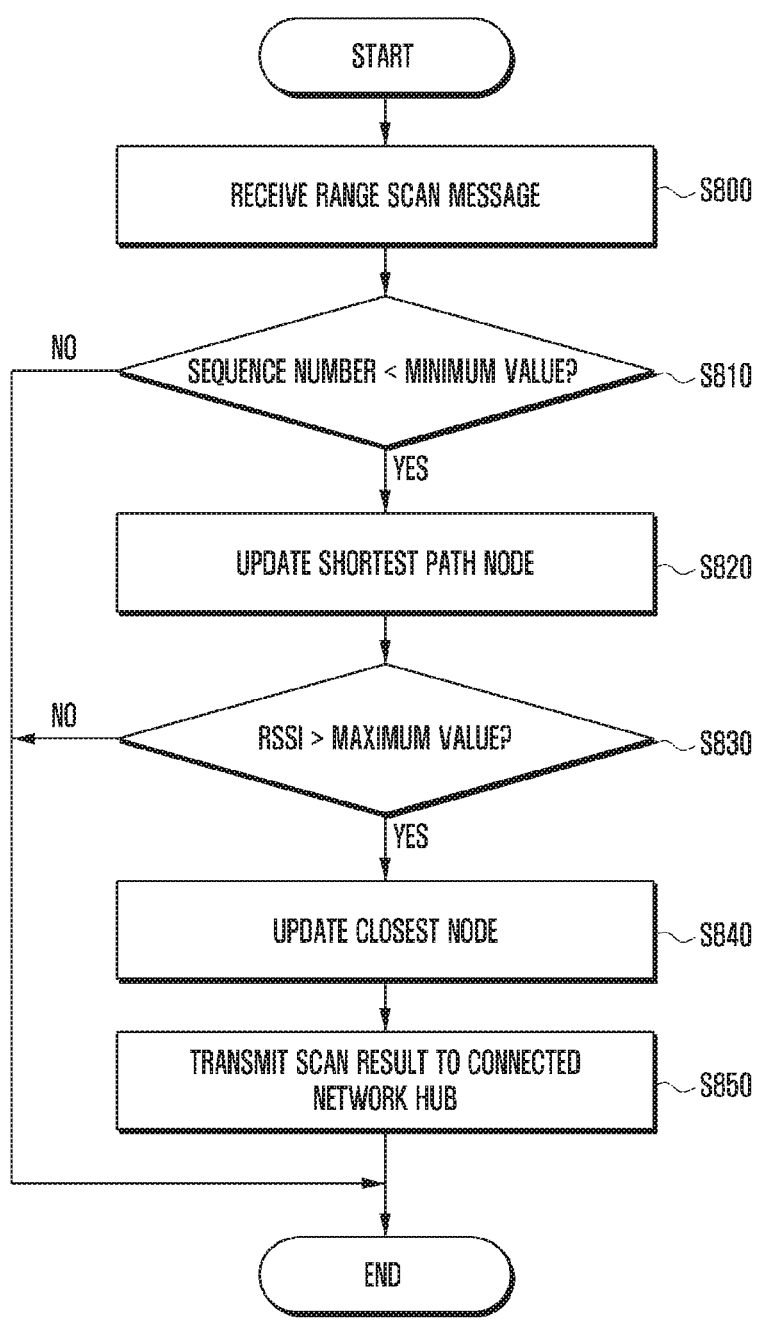
FIG. 8 is a flowchart for explaining a method for an electronic device to determine communication status information according to another embodiment of the present invention.

FIG. 8 is a flowchart for explaining a method for an electronic device to determine communication status information according to another embodiment of the present invention.

At step S800, the electronic device may receive a range scan message. For example, in the embodiment of FIG. 6B, the electronic device a5 60 may receive the range scan message transmitted by the network hub B 630 from the electronic device a6 63.

At step S810, the electronic device may determine whether the sequence number is less than a minimum value. The sequence number is information indicating the number of nodes through which the range scan message traversed.

In the embodiment of FIG. 6B, the electronic device a5 60 may identify the sequence number set to 4 in the range scan message received from the electronic device a6 63.

In order to filter out the range scan messages that have traversed an excessive number of nodes, the electronic device may determine whether the sequence number is less than the minimum value.

If the sequence number is less than the minimum value, the electronic device may update a shortest path node at step S820. If there is no minimum value determined until then, the electronic device a5 60 may designate the electronic device a6 63 with the sequence number of 4 as the shortest path node.

At step S830, the electronic device may determine whether the RSSI value is greater than a maximum value. If the RSSI value is greater than the maximum value, the electronic device may update the closest node at step S840.

For example, if the electronic device a5 60 receives the range scan message with the RSSI value of −30 from the electronic device a6 63, it may set the maximum value of the RSSI to −30.

Typically, the RSSI value is inversely proportional to the distance between the network hub and the electronic device. The electronic device may determine the electronic device that has transmitted the message with the largest RSSI value as the closest node. Accordingly, the electronic device a5 60 may determine the electronic device a6 63 as the closest node.

At step S850, the electronic device may send the scan result to the connected network hub. For example, the electronic device a6 63 may transmit the result obtained as described above to the network hub A 620 before the network hub A 620 operates abnormally. The network hub A 620 may transmit the result to the server 610.

In the embodiment of FIG. 6B, the electronic device a5 60 may perform the aforementioned operations repeatedly on the range scan message received from the network hub C 640.

As exemplified above, if the electronic device a5 60 receives the range scan message with the sequence number of 2 at the RSSI value of −60 from the electronic device c1 64, it may determine at step S810 that the sequence number of the range scan message received from the electronic device c1 64 is less than the minimum value of 4 and thus update the shortest path node to the electronic device c1 64 at step S 820.

However, the electronic device a5 60 may maintain the electronic device a6 63 as the shortest path node because it is determined at step S830 that the RSSI value is not greater than the maximum value of −30.

Although it is depicted in FIG. 8 that the steps of determining the sequence number and RSSI value are performed in sequence, the present invention may also include an embodiment of determining first whether the RSSI value is greater than the maximum value.

According to another embodiment of the present invention, it may also be possible to determine whether the sequence number is less than the minimum value and whether the RSSI value is greater than the maximum value simultaneously and, depending of the received range scan message, it may also be possible to make a determination on whether the sequence number is less than the minimum value or whether the RSSI value is greater than the maximum value In the case where the network hub to which an electronic device is connected is operating abnormally, the electronic device may determine another network hub to connect to autonomously based on the updated shortest path node and closest node information.

For example, when detecting the abnormal operation of the network hub, the server may send a command to a new network hub in order for the new network hub to allow the electronic device to connect thereto. The electronic device may connect to the new network hub using the channel, PAN, and MAC address information included in the received range scan message.

Figure 9:
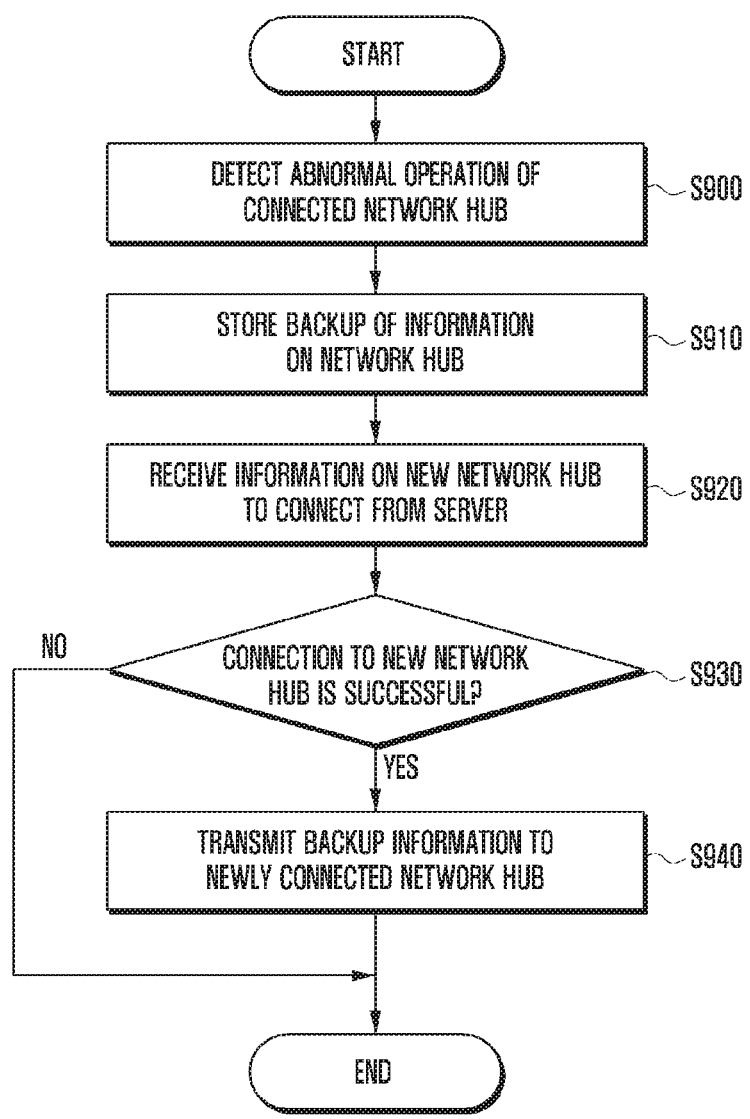
FIG. 9 is a flowchart for explaining a method for an electronic device to switch its connection from an abnormally-operating network hub to a new network hub according to an embodiment of the present invention.

FIG. 9 is a flowchart for explaining a method for an electronic device to switch its connection from an abnormally-operating network hub to a new network hub according to an embodiment of the present invention.

At step S900, the electronic device may detect an abnormal operation of the connected network hub. For example, if the range scan message is not received from the connected network hub in a threshold time, the electronic device may determine that the connected network hub is operating abnormally.

At step S910, the electronic device may store a backup of the information on the network hub. At step S920, the electronic device may receive the information on a new network hub to connect to from the server. As described above, the electronic device may determine the new network hub to connect to autonomously according to an embodiment of the present invention.

If it is determined at step S930 that the connection to the new network hub is successful, the electronic device may send the backup information to the new network hub at step S940.

As described above, the new network hub may receive the information on the abnormally-operating network hub from the electronic device or the server.

A description is made of a method for at least one electronic device that switched its connection from an abnormally-operating network hub to a new network hub to switch back to the network hub that has recovered from operating abnormally.

Figure 10:
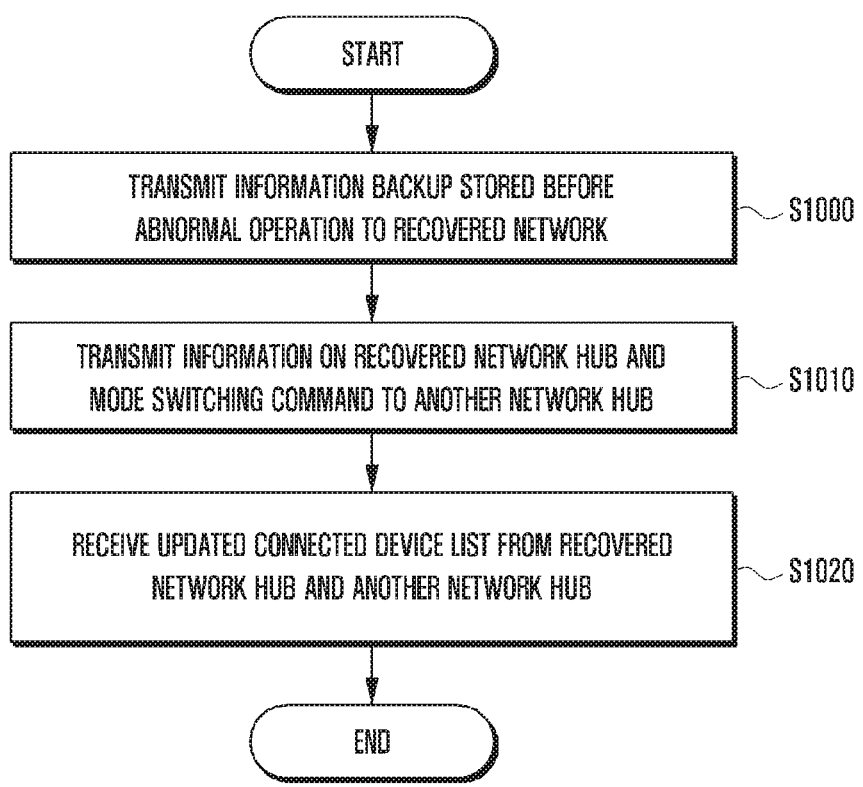
FIG. 10 is a flowchart illustrating a method for a server to control a recovered network hub according to an embodiment of the present invention.

FIG. 10 is a flowchart illustrating a method for a server to control a recovered network hub according to an embodiment of the present invention.

At step S1000, the server may send the recovered network hub the backup information stored before the abnormal operation. In detail, the recovered network hub may send a message to notify the server of the recovery from operating abnormally. Upon receipt of this message, the server may send the recovered network hub the backup information of the network hub that was stored before the abnormal operation. For example, the server may send the recovered network hub at least one of MAC address information, channel information, PAN ID information, and network key.

At step S1010, the server may send the new network hub the information on the recovered network hub or a mode switching command. The new network hub is the network hub to which the electronic device has switched its connection from the old network hub because of the abnormal operation of the old network hub.

If the old network is recovered from operating abnormally the server may send the new network hub the information on the recovered network hub and mode switching command to switch back the connection of the electronic device to the old network hub that has recovered from operating abnormally The new network hub may change the channel information for its original channel. The new network hub may send the information on the recovered network hub to the electronic device.

The electronic device may send a connection request directly to the recovered network hub using the information on the recovered network hub.

At step S1020, the server may receive an updated connected device list from the recovered network hub and the new network hub.

For example, the electronic device connects to the recovered network hub and disconnects from the new network hub, and each of the network hubs may generate the connected device list. Accordingly, the server may receive the updated connected device list from the each network hubs.

Figure 11:
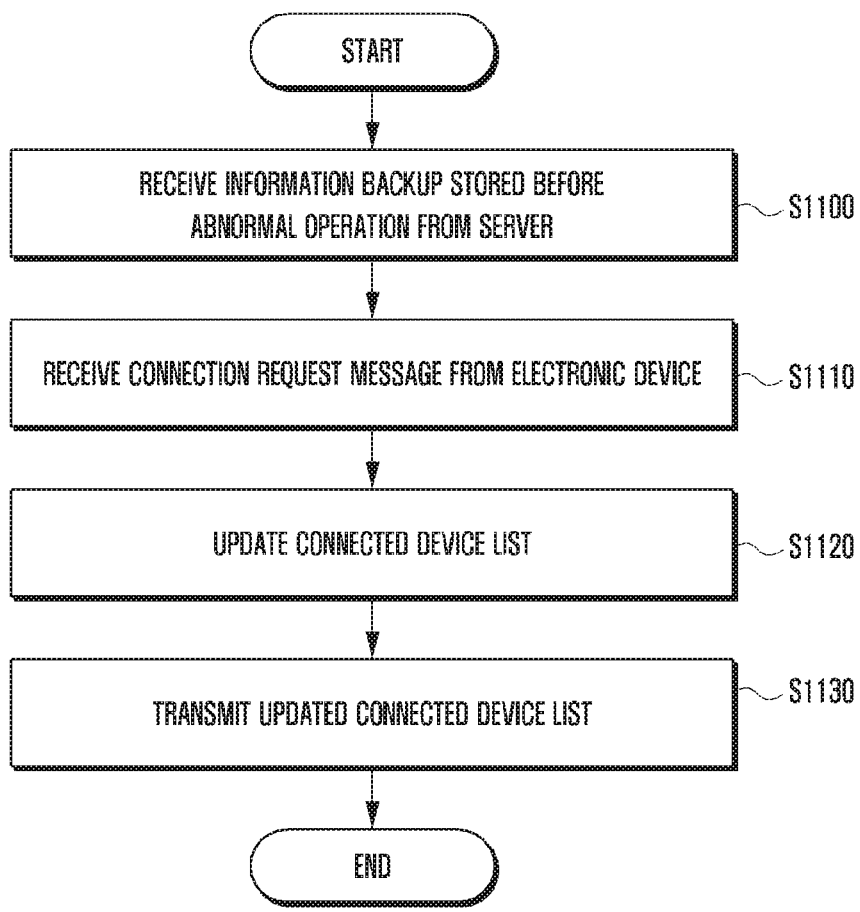
FIG. 11 is a flowchart illustrating a method for establishing a connection between a recovered network hub and an electronic device according to an embodiment of the present invention.

FIG. 11 is a flowchart illustrating a method for establishing a connection between a recovered network hub and an electronic device according to an embodiment of the present invention.

At step S1100, the recovered network hub may receive from the server the backup information stored before the abnormal operation. For example, the recovered network hub may receive at least one of MAC address information, channel information, PAN ID information, and network key from the server.

The recovered network hub may also receive a mode switching command from the server, and the recovered network hub may change its operation mode to a recovery mode according to the mode switching command. In the recovery mode, the recovered network hub may recover the connection with the electronic device that was connected before the abnormal operation.

At step S1110, the recovered network hub may receive a connection request message from the electronic device. The server may send the electronic device to be connected to the recovered network hub the information on the recovered network hub via the network hub that is currently connected with the electronic device.

In the case where the electronic device sends the connection request autonomously based on the information on the recovered network hub, the recovered network hub may receive the connection request message from the electronic device. Then, the recovered network hub may establish a connection with the electronic device.

At step S1120, the recovered network hub may update the connected device list. At step S1130, the recovered network hub may send the updated connected device list to the server.

Figure 12:
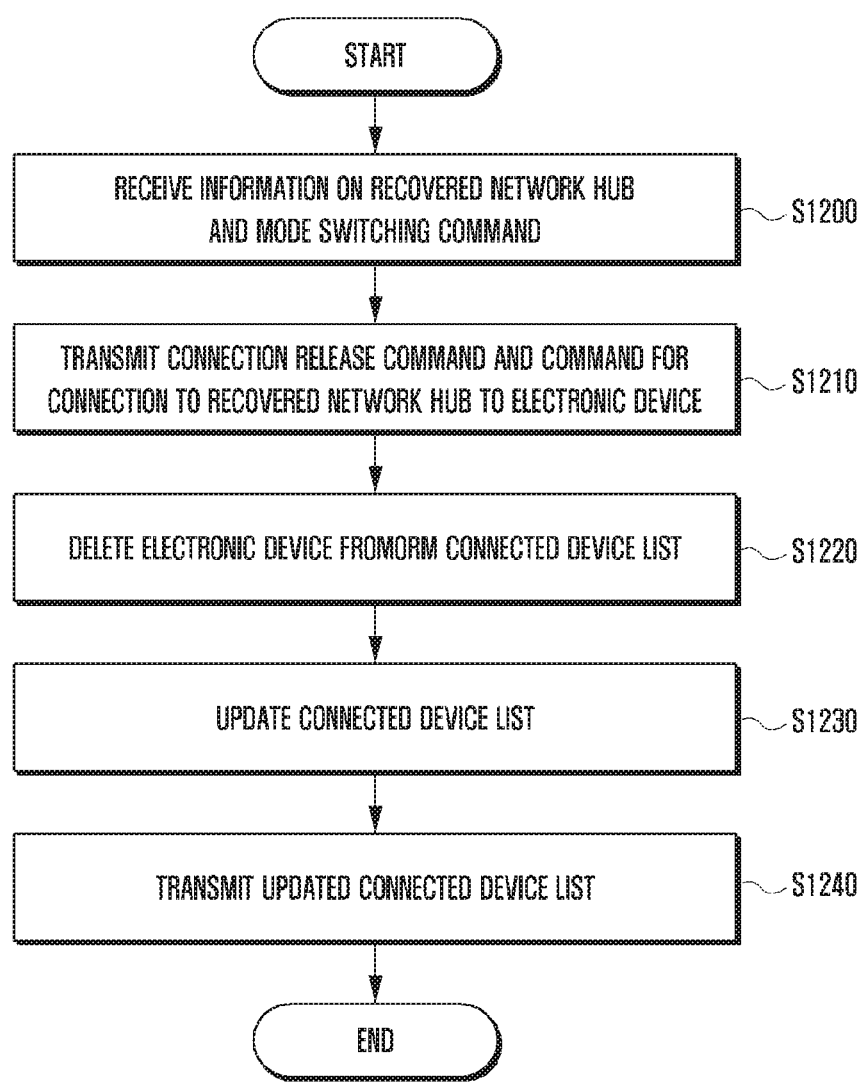
FIG. 12 is a flowchart illustrating a method for a network hub to release a connection with an electronic device according to an embodiment of the present invention.

FIG. 12 is a flowchart illustrating a method for a network hub to release a connection with an electronic device according to an embodiment of the present invention.

The network hub that has established a connection with the electronic device for communication may release the connection when the old network hub to which the electronic device was connected has recovered.

At step S1200, the network hub may receive the information on the recovered network hub and a mode switching command from the server. According to the mode switching command, the network hub may change its operation mode to the normal mode.

At step S1210, the network hub may send the electronic device a connection release command and a command for connection to the recovered network. The network hub may send the connection release command and the connection command in order for the electronic device to establish a connection with the recovered network hub.

The network hub may also send the electronic device information on the recovered network hub that has been received from the server. Accordingly, the electronic device may send the recovered network hub the connection request based on the information on the recovered network hub.

At step S1220, the network hub may delete the electronic device from the connected device list. At step S1230, the network hub may send the updated connected device list to the server.

Figure 13:
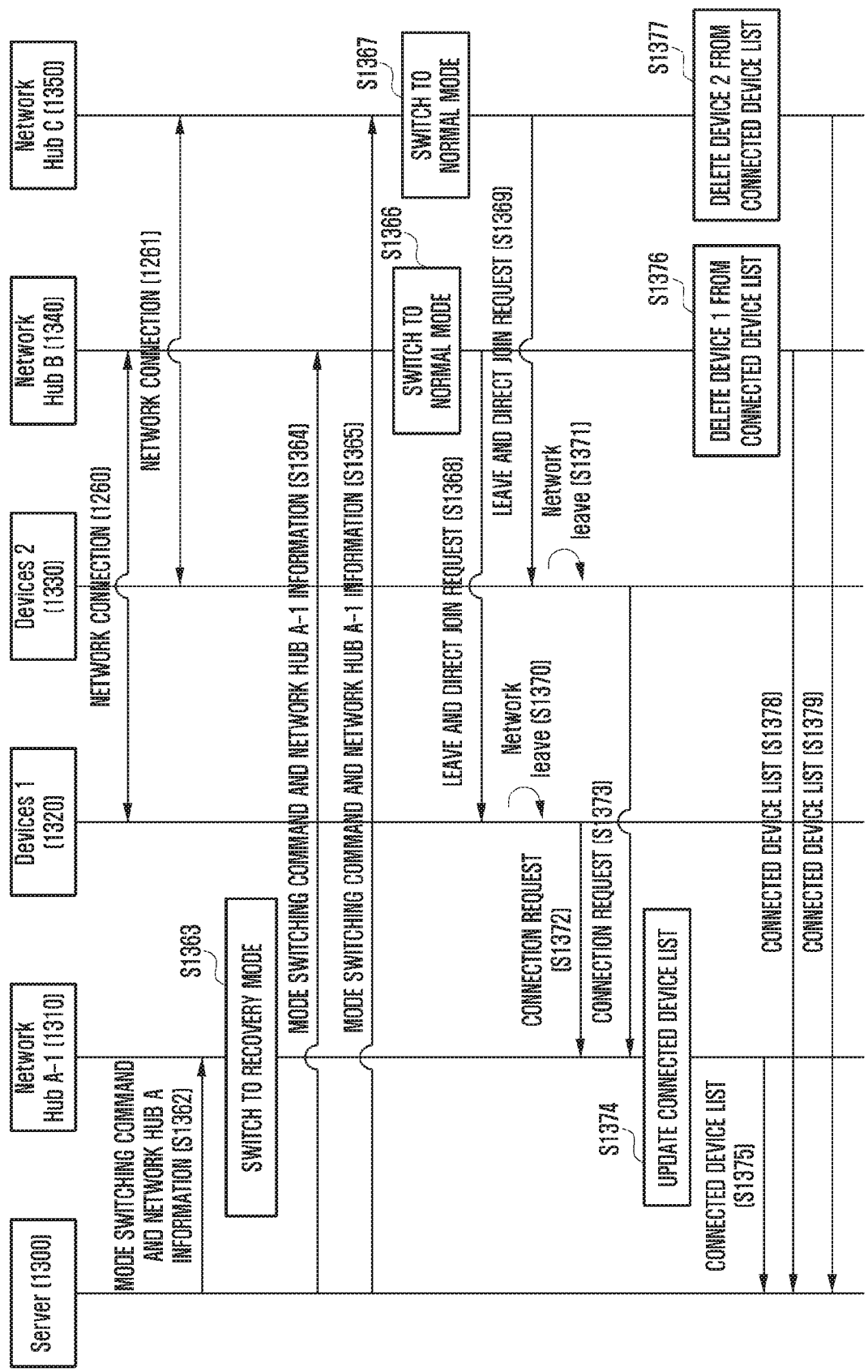
FIG. 13 is a signal flow diagram illustrating a procedure after recovery of an abnormally-operating network hub according to an embodiment of the present invention.

A description is made of a method for an electronic device to reestablish a connection to a recovered network hub, with reference to FIG. 13.

In FIG. 13, it is assumed that the abnormally-operating network hub is referred to as network hub A, and the network hub recovered from operating abnormally is referred to as network hub A-1. Also, it is assumed that the electronic devices 1 and 2 connected to the network hub A for communication switch their connections from the abnormally-operating network hub A to the network hubs B and C, respectively.

At step S1360, the electronic device 1 1320 and the network hub B 1340 are connected to each other. At step S1361, the electronic device 2 1330 and the network hub C 1350 are connected to each other.

At step S1362, the server 1300 detects the recovery of the network hub A and sends the network hub A-1 1310 a mode switching command and information on the network hub A.

If the server 1300 receives a 'keep-alive' message from the recovered network hub A-1 1310, it may determine that the network hub has been recovered. Accordingly, the server 1300 may send information on the network hub A to the network hub A-1 1310 such that the recovered network hub A-1 1310 operates normally as before operating abnormally.

At step S1363, the network hub A-1 1310 may enter a recovery mode. The recovery mode allows connection of the electronic device.

At step S1364, the server 1300 may send the network hub B 1340 the mode switching command and the information on the network hub A-1 1310. At step S1365, the server 1300 may also send the network hub C 1350 the mode switching command and the information on the network hub A-1 1310.

The network hub B 1340 may enter the normal mode at step S1366, and the network hub C 1350 may enter the normal mode at step S1367. The normal mode may mean a mode in which no abnormality is detected at other network hubs and thus there is no need of attempting connection to the electronic devices connected to the other network hubs.

At step S1368, the network hub B 1340 may send the electronic device 1 1320 a command for releasing the connection to the network hub B 1340 and establish a connection to the network hub A-1 1310. At step S1269, the network hub C 1350 may send the electronic device 2 1330 a command for releasing the connection to the network hub C 1350 and establishing a connection to the network hub A-1 1310.

At step S1370, the electronic device 1 1320 may release the connection to the network hub B 1340. At step S1371, the electronic device 2 1330 may release the connection to the network hub C 1350.

At step S1372, the electronic device 1 1320 may send a connection request to the network hub A-1 1310. Also, the electronic device 2 1330 may send a connection request to the network hub A-1 1310 at step S1373.

The network hub A-1 1310 may establish a connection with each of the electronic devices that has transmitted the connection request and update the connected device list at step S1374. At step S1375, the network hub A-1 1310 may send the server 1300 the connected device list.

At steps S1376 and S1377, the network hub B 1340 and the network hub C 1350 may delete the information on the electronic device 1 1320 and the electronic device 2 1330, respectively, from their connected device lists.

At steps S1378 and S1379, the network hub B 1340 and the network hub C 1350, respectively, may send the server 1300 their connected device lists.

In FIG. 13, the messages exchanged between the network hubs and electronic devices may be encrypted with an application key that has been previously transmitted by the server. Accordingly, the messages may be decoded only between neighboring personal area networks (PANs)

Figure 14:
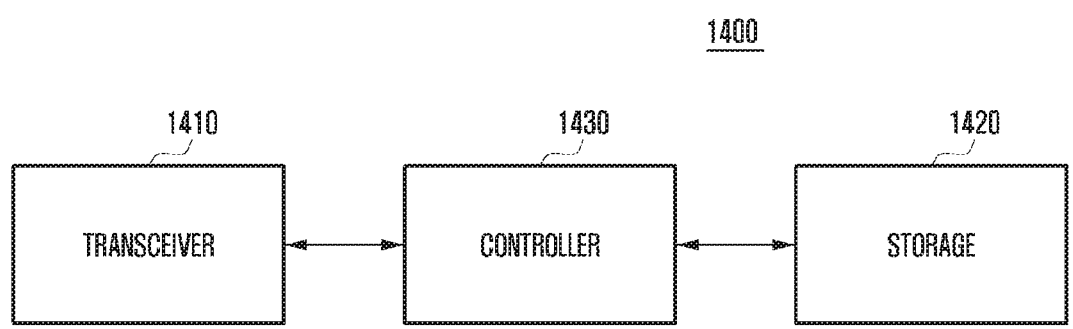
FIG. 14 is a block diagram illustrating a configuration of a server according to an embodiment of the present invention.

FIG. 14 is a block diagram illustrating a configuration of a server according to an embodiment of the present invention.

As shown in FIG. 14, the server 1400 may include a transceiver 1410, a storage 1420, and a controller 1430.

The transceiver 1410 may transmit/receive signals. For example, the server 1400 may communicate with at least one network hub and electronic devices and user terminals connected to the network hub by means of the transceiver 1410.

The storage 1420 is a component for storing various pieces of information. For example, the storage 1420 may store the communication status information received from the individual electronic devices. The storage 1420 may also store the communication status information map generated based on the communication status information.

The controller 1430 is a component for controlling overall operations of the server 1400. The controller 1420 may control the transceiver 1410 to receive the communication status information of at least one electronic device connected to at least one network hub from the at least one network hub; determine, when an abnormal operation of a network hub is detected, a new network hub for connection of a first electronic device connected to the network hub operating abnormally based on the received communication status information; and control the transceiver 1410 to send the new network hub a connection request for the first electronic device.

The controller 1430 may control the transceiver 1410 to receive the communication status information that the at least one electronic device connected to the at least one network hub transmits periodically and generate a communication status information map for the network hub and the at least one electronic device based on the received communication status information.

The controller 1430 may determine a new network hub for connection of the first electronic device connected to the network based on at least one of RSSI information, path length information, and number of electronic devices connected to the network hubs except for the abnormally-operating network hub.

The controller 1440 may also control the transceiver 1410 to transmit channel information and identity information of the abnormally-operating network hub.

If a control command for the first electronic device is received from a second electronic device by means of the transceiver 1410, the controller 1440 may control the transceiver 1410 to transmit the control command to the newly determined network hub.

If the abnormally-operating network hub is recovered, the controller 1440 may control the transceiver 1410 to send the recovered network hub the information on the network hub that has been stored before the detection of the abnormal operation and to send the new network hub to which the first electronic device has connected a command for mode switching to the normal mode.

The previously stored information on the network hub may include at least one of MAC address information of the network hub, channel information, personal area network (PAN) ID information, and network key information.

The controller 1440 may control the transceiver 1410 to transmit an application key to the at least one network hub.

The at least one network hub may broadcast a range scan message encrypted with the application key through all channels.

Figure 15:
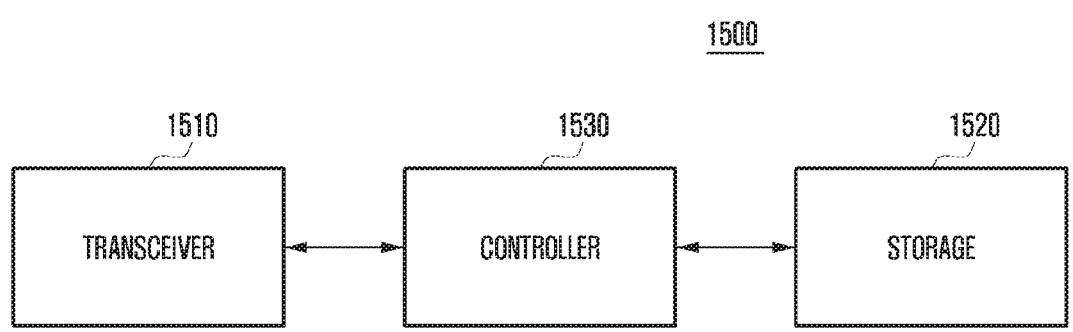
FIG. 15 is a block diagram illustrating a configuration of an electronic device according to an embodiment of the present invention.

FIG. 15 is a block diagram illustrating a configuration of an electronic device according to an embodiment of the present invention. As shown in FIG. 15, the electronic device 1500 may include a transceiver 1510, a storage 1520, and a controller 1530.

The transceiver 1510 is a component for communication with a network hub. The transceiver 1510 may also communicate with the server 1400 through the network hub.

The storage 1520 is a component for storing various pieces of information. For example, the storage 1520 may store communication status information.

The controller 1530 is a component for controlling overall operations of the electronic device 1500.

The controller 1530 may control the transceiver 1510 to receive a range scan message from at least one network hub.

The controller 1530 may also determine at least one of a length of the path through which the range scan message traverses and received signal strength indication or received signal strength indicator (RSSI) based on the received range scan message.

When an abnormal operation of the network hub connected to the electronic device is detected, the controller 1530 may determine a new network hub for connection of the electronic device based on at least one of the path length and RSSI.

The above-described components of the server and the electronic device may be implemented in software. The controller of the server or the electronic device may include a non-volatile memory such as flash memory. The non-volatile memory may store programs for carrying out the operations of the server and the electronic device.

The controller of the server or the electronic device may be implemented in the form of including a central processing unit (CPU) and a random-access memory (RAM). The CPU of the controller may copy the programs stored in the non-volatile memory to the RAM and execute the copied programs to perform the functions of the base station as described above.

The controller is a component for controlling the server or the electronic device. The term "controller" may be interchangeably used with the same meaning as a central processing device, microprocessor, control unit, processor, and operating system. The controller of a receiving device may be implemented in the form of a single chip system(System-on-a-chip, System on chip, SOC, or SoC) along with other functional components such as a transceiver included in the receiving device.

The control methods of the server and electronic device according to various embodiments of the present invention may be coded in software and stored in a non-transitory readable medium. The non-transitory readable medium may be used in various devices.

The non-transitory readable medium means a machine-readable medium for storing data semi-persistently rather than a medium for storing data temporarily such as register, cache, and memory. In detail, the non-transitory readable media may include CD, DVD, hard disc, Blu-ray disc, USB, memory card, and ROM.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention and such modifications and changes should not be understood individually from the technical spirit or prospect of the present invention.

The invention claimed is:

1. A control method of a server, the method comprising:
   receiving, from a plurality of network hubs, communication status information of at least one electronic device connected to at least one network hub, the plurality of the network hubs being connected to the server;
   determining, if an abnormal operation of a first network hub is detected, a second network hub for connection of a first electronic device connected to the first network hub based on the received communication status information;
   transmitting a connection request of the first electronic device to the second network hub; and
   transmitting an application key to the plurality of the network hubs,
   wherein a range scan message encrypted with the application key periodically is broadcasted, by the at least one electronic device, to determine a transmission path of the range scan message or to measure a received signal strength indication (RSSI).

2. The method of claim 1, wherein the receiving further comprises:
   receiving the communication status information periodically from the at least one electronic device connected to the at least one network hub; and
   generating a communication status information map for the plurality of the network hubs and the at least one electronic device using the received communication status information.

3. The method of claim 1, wherein the determining further comprises determining the second network hub for the connection of the first electronic device based on at least one of the RSSI, a received signal strength indicator information, path length information, and a number of electronic devices connected to network hubs except for the first network hub that are included in the communication status information.

4. The method of claim 1, wherein transmitting the connection request comprises transmitting channel information and identity information of the first network hub.

5. The method of claim 1, further comprising transmitting, if a control command for controlling the first electronic device is received from a second electronic device, the control command to the second network hub.

6. The method of claim 1, further comprising:
transmitting, if the first network hub is recovered, to the first network hub, information on the first network hub that was stored before detection of the abnormal operation; and
transmitting, to the second network hub a mode switching command for switching to a normal mode,
wherein the information on the first network hub comprises at least one of media access control (MAC) address information, channel information, personal area network (PAN) identity information, and network key information.

7. A server comprising:
a transceiver; and
a controller configured to control the transceiver to receive, from a plurality of network hubs, communication status information of at least one electronic device connected to at least one network hub, the plurality of network hubs being connected to the server, determine, if an abnormal operation of a first network hub is detected, a second network hub for connection of a first electronic device connected to the first network hub based on the received communication status information, control the transceiver to transmit a connection request of the first electronic device to the second network hub, and to transmit an application key to the plurality of the network hubs,
wherein a range scan message encrypted with the application key periodically is broadcasted, by the at least one electronic device, to determine a transmission path of the range scan message or to measure a received signal strength indication (RSSI).

8. The server of claim 7, wherein the controller is configured to control the transceiver to receive the communication status information that is received periodically from the at least one electronic device connected to the at least one network hub connected and generate a communication status information map for the plurality of network hubs and the at least one electronic device using the received communication status information.

9. The server of claim 7, wherein the controller is configured to control to determine the second network hub for the connection of the first electronic device based on at least one of the RSSI, a received signal strength indicator information, path length information, and a number of electronic devices connected to network hubs except for the first network hub that are included in the communication status information.

10. The server of claim 7, wherein the controller is configured to control the transceiver to transmit channel information and identity information of the first network hub.

11. The server of claim 7, wherein the controller is configured to control the transceiver to transmit, if a control command for controlling the first electronic device is received from a second electronic device, the control command to the second network hub.

12. The server of claim 7, wherein the controller is configured to control the transceiver to transmit, if the first network hub is recovered, to the first network hub, information on the first network hub that was stored before detection of the abnormal operation and, to the second network hub, a mode switching command for switching to a normal mode.

13. The server of claim 12, wherein the information on the first network hub that was stored before detection of the abnormal operation comprises at least one of media access control (MAC) address information, channel information, personal area network (PAN) identity information, and network key information.

* * * * *